United States Patent
Carlson (10) Patent No.: US 10,841,007 B1
(45) Date of Patent: Nov. 17, 2020

(54) FULL DUPLEX LASER COMMUNICATION TERMINAL ARCHITECTURE WITHOUT DEDICATED BEACON LASER

(71) Applicant: BAE SYSTEMS Information and Electronic Systems Integration Inc., Nashua, NH (US)

(72) Inventor: Robert T. Carlson, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/720,362

(22) Filed: Dec. 19, 2019

(51) Int. Cl.
| | |
|---|---|
| H04B 10/11 | (2013.01) |
| H04B 10/112 | (2013.01) |
| H04B 10/50 | (2013.01) |

(52) U.S. Cl.
CPC ....... H04B 10/1125 (2013.01); H04B 10/504 (2013.01); H04B 10/11 (2013.01); H04B 10/112 (2013.01); H04B 10/1123 (2013.01)

(58) Field of Classification Search
CPC .............. H04B 10/1125; H04B 10/504; H04B 10/112; H04B 10/1123; H04B 10/11
USPC .................................................. 398/118–131
See application file for complete search history.

(56) References Cited

U.S. PATENT DOCUMENTS

| | | | | | |
|---|---|---|---|---|---|
| 5,060,304 | A | * | 10/1991 | Solinsky ............ | H04B 10/1127 356/141.3 |
| 5,329,395 | A | * | 7/1994 | Endo .................. | H04B 10/1125 398/122 |
| 5,594,580 | A | * | 1/1997 | Sakanaka .......... | H04B 10/1125 398/122 |
| 5,627,669 | A | * | 5/1997 | Orino .................. | H04B 10/118 398/129 |
| 5,689,354 | A | * | 11/1997 | Orino ................. | H04B 10/1125 398/129 |

(Continued)

OTHER PUBLICATIONS

Bentz et al, Signal to Noise Ratio (SNR) Enhancement Comparison of Impulse Coding, Mar. 2014, Photonics, All Document. (Year: 2014).*

*Primary Examiner* — Dibson J Sanchez
(74) *Attorney, Agent, or Firm* — Maine Cernota & Rardin; Scott J. Asmus (57) ABSTRACT

A laser communication architecture provides precise optical alignment between terminals without requiring dedicated beacon lasers or dedicated beacon wavelength optics. Instead, the same lasers and optics are used for both alignment and communication. A beacon modulation is applied to alignment beacons transmitted at or near communication wavelengths so as to differentiate them from communication beams. The beacon modulation can include phase and/or amplitude variation of a high frequency modulation, and/or "ping-pong" toggling of the beacon wavelength. In some full duplex red/blue embodiments, ping-pong modulation is implemented by alternated red/blue tuning of the transmit laser or by switching between separate red and blue transmit lasers, for example using a 2×1 laser switch, while maintaining constant beacon amplitude, thereby avoiding optical amplifier dynamic response issues. During communication, embodiments maintain optical alignment by diverting a percentage of received communication light to the tracking sensor.

18 Claims, 5 Drawing Sheets

(56) References Cited

U.S. PATENT DOCUMENTS

| | | | | |
|---|---|---|---|---|
| 6,091,528 A * | 7/2000 | Kanda | H04B 10/118 | 398/1 |
| 6,175,451 B1 * | 1/2001 | Iriyama | G02B 7/1821 | 359/627 |
| 6,268,944 B1 * | 7/2001 | Szapiel | H04B 10/118 | 398/129 |
| 6,335,811 B1 * | 1/2002 | Sakanaka | H04B 10/11 | 398/129 |
| 6,384,944 B1 * | 5/2002 | Takayama | H04B 10/1125 | 398/121 |
| 6,389,047 B1 * | 5/2002 | Fischer | H01S 3/067 | 372/102 |
| 6,493,122 B1 * | 12/2002 | Degura | H04B 10/1125 | 398/106 |
| 6,577,421 B1 * | 6/2003 | Cheng | H04B 10/1125 | 398/129 |
| 6,616,352 B1 * | 9/2003 | Shigeta | H04B 10/1125 | 398/122 |
| 6,968,133 B2 * | 11/2005 | Sakanaka | H04B 10/1127 | 398/122 |
| 7,058,307 B2 * | 6/2006 | Sakanaka | G02B 26/0816 | 398/118 |
| 7,076,171 B2 * | 7/2006 | Ohtsubo | H04B 10/1125 | 398/129 |
| 7,289,737 B2 * | 10/2007 | Ohmuro | H04B 10/1125 | 398/128 |
| 7,343,099 B2 * | 3/2008 | Wirth | G02B 26/06 | 398/123 |
| 7,346,282 B2 * | 3/2008 | Sakanaka | H04B 10/1125 | 359/838 |
| 7,450,855 B2 * | 11/2008 | Ohmuro | G02B 6/06 | 398/118 |
| 10,158,427 B2 | 12/2018 | Carlson | | |
| 2002/0080452 A1 * | 6/2002 | Sakanaka | H04B 10/11 | 398/121 |
| 2002/0131121 A1 * | 9/2002 | Jeganathan | H04B 10/1127 | 398/128 |
| 2002/0196506 A1 * | 12/2002 | Graves | H04B 10/1125 | 398/126 |
| 2004/0042798 A1 * | 3/2004 | Kehr | H04B 10/1123 | 398/135 |
| 2004/0141753 A1 * | 7/2004 | Andreu-von Euw | H04B 10/1127 | 398/122 |
| 2004/0202472 A1 * | 10/2004 | Giles | H04J 14/0227 | 398/75 |
| 2005/0141897 A1 * | 6/2005 | Takahashi | H04B 10/1125 | 398/118 |
| 2007/0031150 A1 * | 2/2007 | Fisher | H04B 10/1125 | 398/128 |
| 2007/0031151 A1 * | 2/2007 | Cunningham | H04B 10/1123 | 398/131 |
| 2011/0274432 A1 * | 11/2011 | Cunningham | H04B 10/112 | 398/96 |
| 2012/0308239 A1 * | 12/2012 | Sheth | H04B 10/1125 | 398/131 |
| 2014/0233958 A1 * | 8/2014 | Hulsey | G02B 26/0858 | 398/93 |
| 2015/0215040 A1 * | 7/2015 | Dickson | H04B 10/1125 | 398/131 |
| 2017/0054499 A1 * | 2/2017 | Graves | H04B 10/112 | |
| 2018/0088280 A1 * | 3/2018 | Kim et al. | H04B 10/1127 | 398/122 |

* cited by examiner

FULL DUPLEX LASER COMMUNICATION TERMINAL ARCHITECTURE WITHOUT DEDICATED BEACON LASER

FIELD OF THE DISCLOSURE

The present disclosure relates to wireless communications, and more particularly, to wireless laser communications.

BACKGROUND

Due to an explosion in both civilian and military wireless communication, there is a growing need for high speed, reliable, secure, wireless communication of large amounts of data between communicating terminals. Traditional communication by wireless radio frequencies suffers from several shortcomings, including rapid attenuation of signal strengths with distance and limited available communication bands. In addition, radio signals can be easily intercepted by unintended and sometimes hostile receivers. Furthermore, it is relatively easy for hostile antagonists to attempt to jam radio communications by transmitting radio signals at high energies that blanket a region of interest.

Laser communication offers an attractive wireless alternative to radio communication, especially when point-to-point communication is required, because the non-dispersed, focused character of laser communication intrinsically avoids most of the problems that are associated with radio communication. Laser communication eliminates the need for frequency planning and authorization, and circumvents the highly congested RF spectrum bandwidth constraints that limit the practical data rates available to users of RF links. Laser signals also experience very little attenuation as a function of distance, because the signal energy remains tightly contained in a beam from a diffraction-limited optical aperture with exceptionally low divergence. Also, laser communication security is intrinsically high, because interception of and interference with laser communications requires direct interception of a laser communication beam, and/or focusing jamming beams directly at an intended signal receiver.

One important application that can benefit significantly from laser communication is satellite communications, where line-of-sight access is generally available, and where the communication distances are very great. Global laser communication can be realized by forming a laser communication network among a plurality of satellites. Laser communication can provide data rate communications for satellites that are much higher than radio data rates, with unmatched anti-jam characteristics and an inherently low risk of communications intercept.

Nevertheless, while much of the present disclosure is presented in the context of satellite laser communication, it will be understood by those of skill in the art that the present disclosure is not limited to satellite communication, but also applies to other implementations of laser communication, such as a laser communication link between two aircraft.

Full duplex (simultaneous, bi-directional) laser communication can be implemented between terminals in a laser communication network to maximize the network connectivity and bandwidth, and minimize handshake overhead. Typically, two laser wavelengths are implemented in the network, whereby each satellite transmits on one of the two wavelengths and receives on the other. The two implemented wavelengths can generally be referred to as a "first" wavelength and a "second" wavelength. However, for simplicity of expression, the two wavelengths that are implemented in a full duplex laser communication network are sometimes referred to herein as "red" and "blue," although any two wavelengths can be selected, including wavelengths that are not within the visible spectrum. The two wavelengths are typically selected such that the receive channel can be isolated from the transmit channel by a factor of 60 to 100 dB or more. For the Red and Blue COM wavelengths, a more general architecture is a band of Red wavelengths and a band of Blue wavelengths, where multiple channels within each Red or Blue band are combined or separated by conventional fiber-optic wavelength division multiplexing techniques.

Typically, each of the terminals that form a laser communication link is either a "red" terminal, in that it is equipped with a "red" communication transmitting laser, or it is a "blue" terminal, in that it is equipped with a "blue" communication transmitting laser, and the terminals are configured such that "red" satellites are placed into direct communication with "blue" satellites, and vice versa, thereby enabling full duplex communication. Of course, the receivers in the "red" satellites include filters and/or other components that are configured to direct received "blue" laser light to the detector of the receive channel, while excluding any other wavelengths from reaching the detector, and the receivers in the "blue" satellites include similar components that allow only "red" laser light to reach the detector.

Laser communication requires that precision pointing and alignment between the optics of two communicating terminals be established and maintained. This can be challenging, especially when the terminals are separated by a great distance. Generally, one or both terminals transmit an alignment "beacon" that is slightly dispersed in its focus, so that it can be detected by the other terminal. Typically, each acquisition (ACQ) beacon is transmitted at a wavelength that is neither the "red" nor the "blue" communications (COM) wavelength. The beacons are used both for initial alignment during an "acquisition phase," and sometimes also, with reduced power and tighter focus, for maintaining alignment during data communication ("communication phase"). This use of beacons to establish precise alignment allows precision pointing of the much narrower "red" and "blue" communication beams, thereby reducing power consumption while significantly enhancing the signal-to-background ratio and ensuring high speed, accurate communication. Once alignment has been established, the beacon power and angular divergence can be reduced, thereby freeing power to be redirected to the transmit lasers.

Laser communication generally begins with an "acquisition" phase (ACQ) during which alignment is established between two terminals, followed by a communication phase (COM) during which communications are exchanged. During the acquisition phase, each of the terminals broadcasts its beacon at a relatively high power, and with relatively broader beam divergence, because the precise location of the other terminal is not yet known. In order to enable a beacon to be more easily distinguished from background light and from inadvertent or malicious interference by other laser sources, most laser communication terminals pulse or otherwise modulate their beacon using a defined modulation pattern that serves to distinguish the beacon from other sources. The modulation pattern can also serve to identify a given terminal from among other terminals in the network.

Once alignment has been established and the communication phase has begun, the terminals may continue to broadcast their beacons so that the alignment can be maintained. Because of the precise alignment that is achieved during the initial acquisition phase, the beacons can be more tightly focused and reduced in power during the subsequent communication phase, thereby freeing power to be redirected to the transmit lasers of the two terminals. And because the beacons enable the alignment to be established and maintained with high accuracy, the "red" and "blue" communication beams can also be narrowly focused, so that power consumption is reduced while the signal-to-background noise ratio is significantly enhanced, thereby ensuring high speed, accurate communication.

This approach of implementing a red/blue laser network architecture in combination with separate laser beacons is highly effective for establishing and maintaining alignment between communicating terminals and for enabling full duplex communication. However, this common approach requires that each of the terminals must be configured as either a "red" terminal or a "blue" terminal, which limits the ability to reconfigure the laser communication network in response to any disruption, for example if one of the terminals should fail due to a malfunction or a malicious attack. Furthermore, the requirement for a separate beacon laser to be included in at least one of the two terminals implementing a link, and for dedicated beacon optics for transmitting and/or receiving the beacon to be included in one or both of the terminals imposes a space, weight, and complexity penalty on each of the terminals, which can be significant, for example in satellites applications where space, weight, and power are at a high premium.

What is needed, therefore, is a laser communication architecture and method that enable precise alignment to be established and maintained between terminals without requiring the terminals to include beacon lasers and beacon optics configured at one or more dedicated beacon wavelengths that differ from the red and blue communications wavelengths. Preferably, the disclosed architecture and method should provide increased flexibility for reconfiguration of a full duplex laser communication network.

SUMMARY

The present disclosure is a laser communication terminal architecture and method that enable precise alignment to be established and maintained between terminals without requiring the terminals to include dedicated beacon lasers or dedicated beacon optics. In embodiments, the disclosed architecture and method provide increased flexibility for reconfiguration of a full duplex laser communication network.

According to the present disclosure, the disclosed terminal architecture includes a "transmit laser module" containing one or more lasers configured to emit light at the wavelength or wavelengths that are used for transmitting communications over the network. Instead of including an additional, separate, dedicated beacon laser fixed to a wavelength that is not used for communication, terminals that implement the present architecture transmit a beacon during the acquisition phase that is derived from the transmit laser module. A "beacon modulation" is imposed onto the light from the transmit laser module before it is transmitted as a beacon, so that the transmitted light can be identified by other terminals as a beacon, even though it is transmitted at or near a wavelength or wavelengths that is/are also used for transmitting communications in the network.

In addition to eliminating any need for a separate, dedicated beacon laser, this approach obviates any need for dedicated beacon optics such as wavelength multiplexing optics and/or additional filter components that would otherwise be required so as to enable the terminal to receive and monitor a separate beacon wavelength, distinct from the communication wavelengths. Instead, the beacon is received using the communication optics, and is perceived to be a beacon due to the beacon modulation.

In embodiments, a high frequency modulation is imposed onto the beacon, for example to avoid nonlinear effects such as stimulated Brillouin scattering (SBS) when amplified by a high power optical amplifier, and in some of these embodiments the beacon modulation is implemented as a frequency and/or phase variation of the high frequency modulation.

In some embodiments, the beacon is transmitted at a fixed wavelength. In other embodiments, the beacon modulation includes toggling the wavelength of the beacon between two wavelengths, as is described in more detail below. In some of these embodiments, the amplitude of the beacon remains constant, and is not affected by the wavelength toggling. This constant amplitude approach avoids dynamic response issues that are typical of laser optical amplifiers such as erbium-doped fiber amplifier (EDFA) or Ytterbium-Doped Fiber Amplifiers (YDFA).

In embodiments, the disclosed terminal architecture is a full duplex architecture, in that two communication laser wavelengths are implemented in the network, whereby each terminal transmits on one of the two wavelengths and receives on the other. The two communication wavelengths can generally be referred to as a "first" wavelength and a "second" wavelength. However, for simplicity of expression, the two communication wavelengths that are implemented in a full duplex laser communication network are sometimes referred to herein as "red" and "blue," although any two wavelengths can be selected, including wavelengths that are not within the visible spectrum. In embodiments, the two laser wavelengths can be isolated from each other by a factor of 60 to 100 dB or more.

In some full duplex embodiments, each terminal in the laser communication network that implements the disclosed laser communication architecture can be transitioned between transmitting communications at the red wavelength and transmitting communications at the blue wavelength. The receive channels in these terminals include filter assemblies and/or other components that can be transitioned between directing "blue" laser light to the detector of the receive channel while excluding other, extraneous light, and directing "red" laser light to the detector of the receive channel while excluding other, extraneous light. Accordingly, the terminals in these embodiments are red/blue switchable terminals, in that they can be transitioned by a controller between "first" and "second" configurations, also referred to herein as "red" and "blue" configurations, by configuring their transmit channel to transmit communications at either of the red and blue wavelengths, while configuring their receive channel to receive light at the other of the red and blue wavelengths. By convention, a "red" terminal transmits communications at the red wavelength and receives communications at the blue wavelength, while a "blue" terminal does the opposite.

By enabling terminals to be switched between being "red" terminals and being "blue" terminals, embodiments provide greater flexibility for reconfiguring a laser communication network, for example in response to any disruption, such as if one of the terminals should fail due to a malfunction or a malicious attack. Embodiments implement red/blue switchable architecture configurations as described in co-pending application Ser. No. 16/694,082 also filed by the present Applicant.

In some red/blue switchable embodiments, the beacon modulation is an alternation of the beacon wavelength between a first beacon wavelength that is at or near the red wavelength and a second beacon wavelength that is at or near the blue wavelength, thereby forming a beacon that is rapidly switched between the first and second beacon wavelengths, for example at a rate of between 100 Hz and 10 kHz. A beacon that is alternated between two wavelengths in this manner is referred to herein as a "ping-pong" modulated beacon. In embodiments, the ping-pong beacon is constant in amplitude, and in various embodiments the red and blue intervals are of equal length, thereby forming a "square wave" red/blue modulation.

In some of these red/blue switchable embodiments, each terminal includes a single tunable laser that can be tuned between the red and blue wavelengths. In some of these embodiments, the tunable laser is alternately tuned during the acquisition phase between the first and second beacon wavelengths to provide an alignment beacon with ping-pong beacon modulation. For example, embodiments implement tunable lasers similar to the lasers that are used for Dense Wave Division Multiplexing, as specified by the International Telecommunication union ("ITU-DWDM"). In an exemplary embodiment, for example, the blue laser wavelength is Channel #33 at 1550.92 nm, and the Red laser wavelength is Channel #30 at 1553.33 nm, thereby providing a separation of 2.4 nm between the red and blue wavelengths.

In other red/blue switchable embodiments, the disclosed terminal architecture comprises a transmit laser module that includes two transmit lasers referred to herein as the "red" laser and the "blue" laser, that can be tuned respectively to the red and blue communication wavelengths. In some of these embodiments the outputs of the two transmit lasers are alternately directed into the laser transmission channel during the acquisition phase. In certain of these embodiments, during acquisition, the two transmit lasers direct continuous beams into a laser selector, such as a 2:1 single pole double throw (SPDT) fiber-optic switch, and the laser selector is rapidly actuated so that a ping-pong beam is created. In embodiments, the SPDT switch or other laser selector has a switching "dead time" of less than 0.5 us, or even less than 0.3 usec. In other embodiments, the transmit laser outputs are simply combined, and the red and blue lasers are alternately driven to produce an output beam of constant amplitude and ping-pong beacon modulation.

In some embodiments that include separate red and blue transmit lasers, the red and blue lasers are tunable over limited wavelength ranges. And in some of these embodiments, where a ping-pong beacon is implemented during the acquisition phase, at least one of the red and blue lasers is tuned away from its communication wavelength during the acquisition phase so that the separation between the two laser wavelengths of the ping-pong beacon is increased, thereby improving discrimination between the two wavelengths by the receive channel filters during acquisition and improving the accuracy of the data provided by the highly sensitive "acquisition and track sensor" (ATS) that is used to establish optical alignment. During the communication phase, the two lasers are re-tuned to their respective communication wavelengths, which are sufficiently separated from each other to satisfy the requirements of the communication detector.

For example, in embodiments if the red and blue wavelengths are separated by 3.2 nm, and if during the acquisition phase the receive channel of a first laser communication terminal is tuned to the red communication wavelength while receiving a ping-pong beacon from a second laser communication terminal, then the blue laser of the second laser communication terminal can be off-tuned so that the separation between the two ping-pong wavelengths is increased to e.g. 5.2 nm, thereby enabling the filters that are included in the receive channel to provide greater suppression of the blue component of the beacon light.

Embodiments include at least one high power optical amplifier (HPOA) that amplifies the light from the transmit laser module before it is emitted from the laser communication terminal. In various embodiments, the HPOA is an erbium-doped fiber amplifier (EDFA) or an yttrium-doped fiber amplifier (YDFA). In embodiments, the "red" and "blue" wavelengths are selected to be close enough to each other to limit gain variation in the HPOA to less than 1 dB, while remaining sufficiently separated to allow at least 60 dB, and in embodiments up to more than 100 dB, transmit/receive isolation. For example, in embodiments the red and blue wavelengths are in the 1550 nm spectral region and are separated by between 2.4 nm (300 GHz) and 15 nm (1875 GHz).

In some embodiments the light that is emitted by the laser transmit module is modulated at a high frequency before reaching the HPOA so as to avoid stimulated Brillouin scattering (SBS). For example a Mach Zender modulator (MZM) can be used to modulate both wavelengths of the ping-pong beacon with a 50% duty cycle at the communications carrier frequency, or at some other rate that is at least 5 times faster than the ping-pong wavelength switching rate. In some of these embodiments, the beacon modulation includes variation of the amplitude, frequency, and/or phase of this high frequency modulation.

According to the disclosed terminal architecture, at any given time the receive module of the terminal is configured to receive input at only one laser wavelength while excluding all other wavelengths. As a result, ping-pong modulated alignment beacons are perceived by the receiving terminal as being square wave modulated, thereby distinguishing the ping-pong beacons from other light sources due to the perceived intensity modulation of the beacons after wavelength filtering by the receive module.

In embodiments, once alignment has been completed between two terminals and the communication phase has begun, the communication signals themselves are used for spatial tracking to maintain optical alignment between the terminals. In particular, a receive beam splitter is implemented in each terminal that apportions received communication laser light between a communication detection channel and the ATS In various embodiments, circular polarization is imposed onto both the alignment beacons and the communication beams that are transmitted by the laser communication terminal during the acquisition and the communication phases, respectively. When circular polarized light is received from a remote terminal in these embodiments, it is converted into linear polarized received light and directed to the receive channel.

A first general aspect of the present disclosure is a laser communication terminal that is configured to establish optical alignment with a remote terminal during an acquisition phase, and to communicate message information with the remote terminal during a communication phase. The laser communication terminal includes a transmit channel comprising a transmit laser module that is configured to emit transmit laser light at a first communication wavelength, the transmit laser module being configured to impose a beacon modulation onto the transmit laser light that enables the transmit laser light, when transmitted at or near the first communication wavelength as an alignment beacon during the acquisition phase, to be identified as an alignment beacon by the remote terminal, a modulator configured to modulate the transmit laser light, and a receive channel. The receive channel includes a receive filter module configured to pass light that is at or near a second communication wavelength with minimal attenuation while excluding light at all other wavelengths, an acquisition and track sensor ("ATS") configured to derive tracking information from beacon laser light received from the remote terminal via the receive filter module at or near the second communication wavelength during the acquisition phase, and to provide the tracking information to a controller, according to which the controller is able to cause the laser communication terminal to be optically aligned with the remote terminal, and a communication detector configured to derive communication information from communication laser light received from the remote terminal via the receive filter module at the second communication wavelength during the communication phase. The laser communication terminal further includes a receive beam splitter configured to apportion the beacon laser light and the communication laser light between the ATS and the communication detector.

In embodiments, the transmit channel is configured to impose a high frequency modulation onto the alignment beacon, and wherein the beacon modulation includes at least one of a frequency variation and a phase variation of the high frequency modulation.

In any of the above embodiments, an amplitude of the alignment beacon can be constant.

In any of the above embodiments, the beacon modulation can include an alternation of the alignment beacon between a first beacon wavelength and a second beacon wavelength. In some of these embodiments the alternation of the alignment beacon between the first beacon wavelength and the second beacon wavelength includes alternating intervals of substantially equal length during which the alignment beacon is respectively at the first and second beacon wavelengths. In any of these embodiments, the first and second beacon wavelengths can respectively be the first and second communication wavelengths. And in any of these embodiments a beacon wavelength separation between the first and second beacon wavelengths can be greater than a communication wavelength separation between the first and second communication wavelengths.

In any of the above embodiments, the transmit laser module can include a laser that is tunable between the first communication wavelength and the second communication wavelength.

In any of the above embodiments, the transmit laser module can include a first laser configured to emit laser light at the first laser wavelength and a second laser configured to emit laser light at the second communication wavelength. In some of these embodiments, the laser light emitted by the first and second lasers is directed to respective first and second inputs of a laser selector, the laser selector being configured to select between its inputs and to direct the laser light from the selected input to the modulator. In some of these embodiments, the laser selector is a 2×1 laser switch. Any of these embodiments, the laser selector can have a selection time that is shorter than 0.5 usec.

In any of the above embodiments, the laser communication terminal can be switchable between a first terminal configuration in which during the communication phase the transmit channel emits laser light at the first communication wavelength and the receive filter module passes light at the second communication wavelength with minimal attenuation while excluding all other wavelengths, and a second terminal configuration in which during the communication phase the transmit channel emits laser light at the second communication wavelength and the receive filter module passes light at the first communication wavelength with minimal attenuation while excluding all other wavelengths.

In any of the above embodiments, the transmit channel can be configured to emit liner polarized laser light, and the laser communication terminal can further include a diplexer that includes a diplexer polarization beam splitter and a quarter-wave plate, the diplexer being configured to transform the linear polarized light emitted by the transmit module into circular polarized laser light that is transmitted by the laser communication terminal, and to convert received circular polarized light into received linear polarized light that is directed to the receive channel.

A second general aspect of the present disclosure is a method of establishing optical alignment between two laser communication terminals. The method includes providing first and second laser communication terminals, each according to the first general aspect, during an acquisition phase, causing the second laser communication terminal to transmit an alignment beacon at or near the second communication wavelength, the alignment beacon having a beacon modulation imposed thereupon, during the acquisition phase, causing the receive channel of the first laser communication terminal to receive light from the alignment beacon and to detect the beacon modulation, during the acquisition phase, causing the first laser communication terminal to direct the light from the alignment beacon to its acquisition tracking sensor (ATS), and to derive tracking information therefrom, and during the acquisition phase, causing the first laser communication terminal to optically align itself with the second laser communication terminal according to the tracking information.

In embodiments, causing the second laser communication terminal to transmit a beacon modulated alignment beacon includes causing the second laser communication terminal to alternate the alignment beacon between a first beacon wavelength and a second beacon wavelength. In some of these embodiments, the alternation of the alignment beacon between the first beacon wavelength and the second beacon wavelength includes alternating intervals of substantially equal length during which the alignment beacon is respectively at the first and second beacon wavelengths. In any of these embodiments, the first and second beacon wavelengths can respectively be the first and second communication wavelengths, or a beacon wavelength separation between the first and second beacon wavelengths can be greater than a communication wavelength separation between the first and second communication wavelengths.

And in any of the above embodiments, the method can further include imposing by the second laser communication terminal of a high frequency modulation onto the alignment beacon, and wherein the beacon modulation includes at least one of a frequency variation and a phase variation of the high frequency modulation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a laser communication terminal architecture and method that enable precise alignment to be established and maintained between terminals without requiring the terminals to include dedicated beacon lasers. In embodiments, the disclosed architecture and method provide increased flexibility for reconfiguration of a full duplex laser communication network According to the present disclosure, with reference to FIG. 1A, the disclosed terminal architecture includes a "transmit laser module" 126 containing one or more lasers configured to emit light at the wavelength or wavelengths that are used during the communication phase for transmitting communications over the network. Instead of including an additional, separate, dedicated beacon laser fixed to a wavelength that is not used for communication, terminals that implement the present architecture transmit a beacon during the acquisition phase that is derived from the transmit laser module 126 using the same laser(s) and other optics that are used to generate communication beams during the communication phase. A "beacon modulation" is imposed onto the beacon so that it can be differentiated from communication beams. The beacon is transmitted only during the acquisition phase. During the communication phase, communication beams are used to maintain the alignment of communicating terminals, as is described in more detail below.

In addition to eliminating any need for a separate, dedicated beacon laser, this approach obviates any need for wavelength multiplexing and/or additional filter components that would otherwise be required to enable the terminal to receive and monitor a separate beacon wavelength, distinct from the communication wavelengths.

Figure 1A:
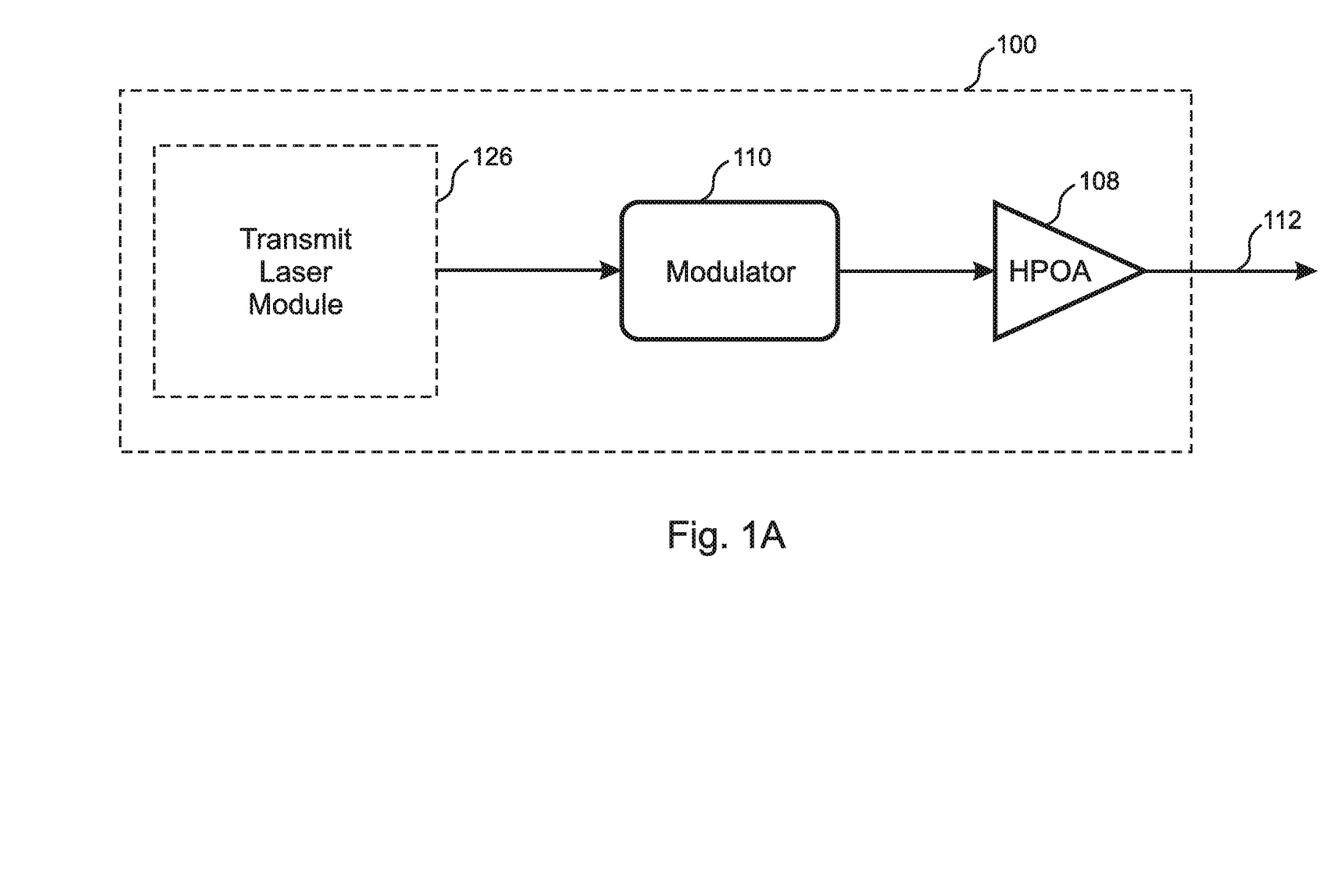
FIG. 1A is a block diagram of a terminal transmit channel in an embodiment of the present disclosure.

In embodiments, so as to avoid stimulated Brillouin scattering (SBS), a high frequency modulation is imposed on the light that is emitted by the transmit laser module 126 during the acquisition phase, for example using the same modulator 110 that is also used during the communication phase to impose information onto the communication beam. And in some of these embodiments, the beacon modulation is implemented by the modulator 110 as a frequency and/or phase variation of this high frequency modulation.

In some embodiments, the light from the modulator 110 is amplified by one or more high power optical amplifiers (HPOA(s)) 108.

In various embodiments the beacon is transmitted at a fixed wavelength. In other embodiments, the beacon modulation includes toggling the wavelength of the beacon between at least two different wavelengths, as is described in more detail below. A beacon having a wavelength that is alternated in this manner is referred to herein as a "ping-pong" modulated beacon. In some of these embodiments, the amplitude of the "ping-pong" beacon remains constant, and is not affected by the wavelength toggling. This approach avoids dynamic response issues that are typical of laser high power optical amplifiers (HPOAs) 108 such as EDFA or YDFA amplifiers.

In embodiments, the disclosed architecture is a full duplex architecture, in that each laser communication terminal transmits on one of two wavelengths that are implemented in the network, and receives on the other. The two implemented wavelengths can generally be referred to as a "first" wavelength and a "second" wavelength. However, for simplicity of expression, the two wavelengths that are implemented in a full duplex laser communication network are sometimes referred to herein as the "red" and "blue" wavelengths, although any two wavelengths can be selected, including wavelengths that are not within the visible spectrum. In embodiments, the two laser wavelengths can be isolated from each other by a factor of 60 to 100 dB or more.

Figure 1B:
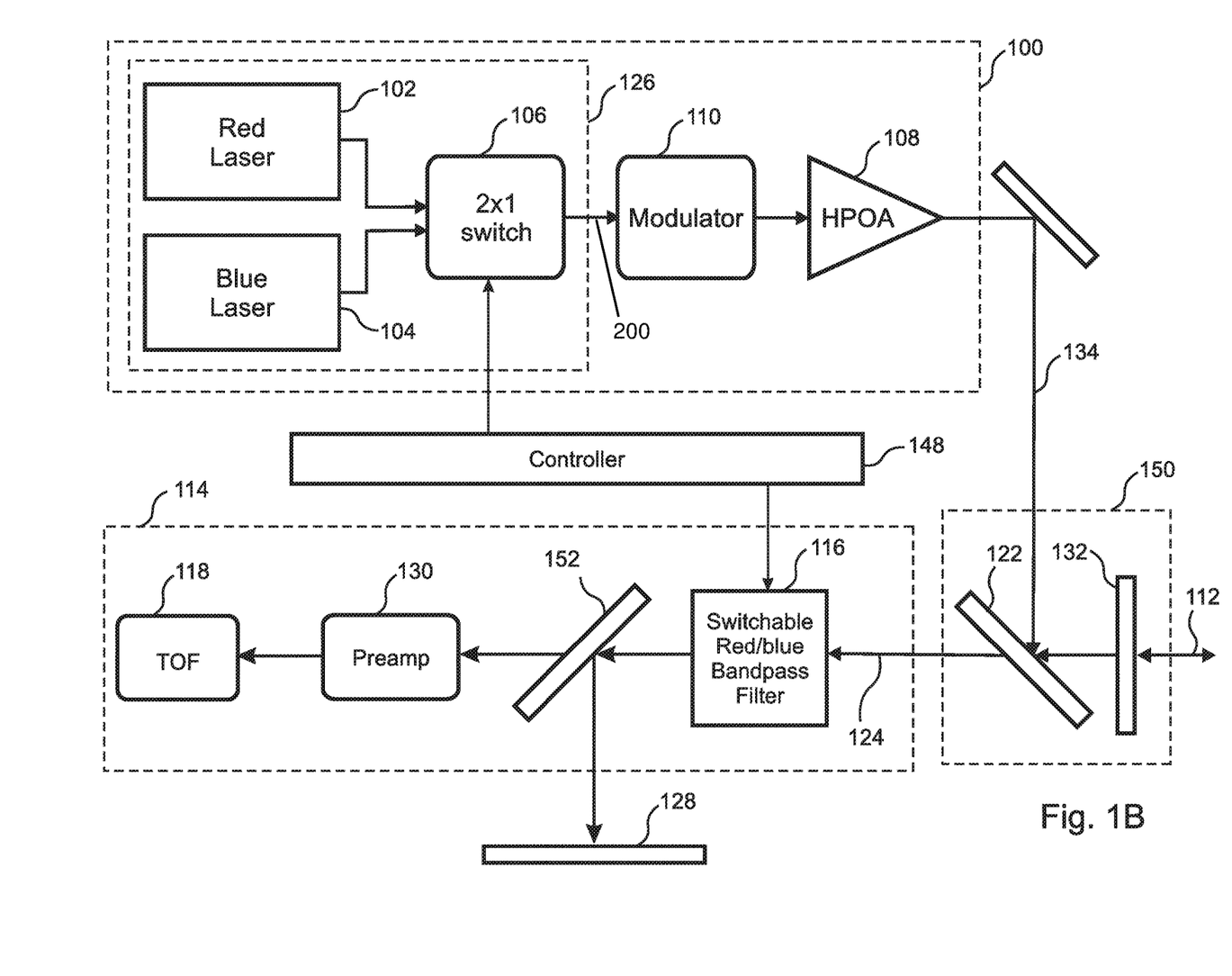
FIG. 1B is a block diagram of a terminal architecture in an embodiment of the present disclosure.

With reference to FIG. 1B, in some full duplex embodiments, each terminal in the laser communication network that implements the disclosed laser communication architecture can be transitioned between transmitting communications at the red wavelength and transmitting communications at the blue wavelength. The receive channels 114 in these terminals include filter assemblies 116 and/or other components that can be transitioned between directing "blue" laser light to the tunable optical filter (TOF) 118, and ultimately to the detector (not shown) of the receive channel while excluding other, extraneous light, and directing "red" laser light to the detector of the receive channel while excluding other, extraneous light.

Accordingly, the terminals in these embodiments are red/blue switchable terminals, in that they can be transitioned by a controller 148 between "first" and "second" configurations, also referred to herein as "red" and "blue" configurations, by configuring their transmit channels 100 to transmit communications at either of the red and blue wavelengths, while configuring their receive channels 114 to receive light at the other of the red and blue wavelengths. By convention, a "red" terminal transmits communications at the red wavelength and receives communications at the blue wavelength, while a "blue" terminal does the opposite.

By enabling terminals to be switched between being "red" terminals and being "blue" terminals, embodiments provide greater flexibility for reconfiguring a laser communication network, for example in response to any disruption, such as if one of the terminals should fail due to a malfunction or a malicious attack. Embodiments implement red/blue switchable architecture configurations as described in co-pending application Ser. No. 16/694,082 also filed by the present Applicant.

In the embodiment of FIG. 1B, the transmit laser module 126 includes two transmit lasers 102, 104, i.e. a "first" transmit laser 102 and a "second" transmit laser 104, which are referred to herein as the "red" laser 102 and the "blue" laser 104. The receiver module 114 in the illustrated embodiment includes filter assemblies 116 and/or other components that can be transitioned according to instructions from the controller 148 between directing "red" laser light to the tunable optical filter (TOF) 118 and ultimately to the detector (not shown) of the receive channel 114 while excluding other extraneous light, and directing "blue" laser light to the detector while excluding other extraneous light.

Figure 2A:
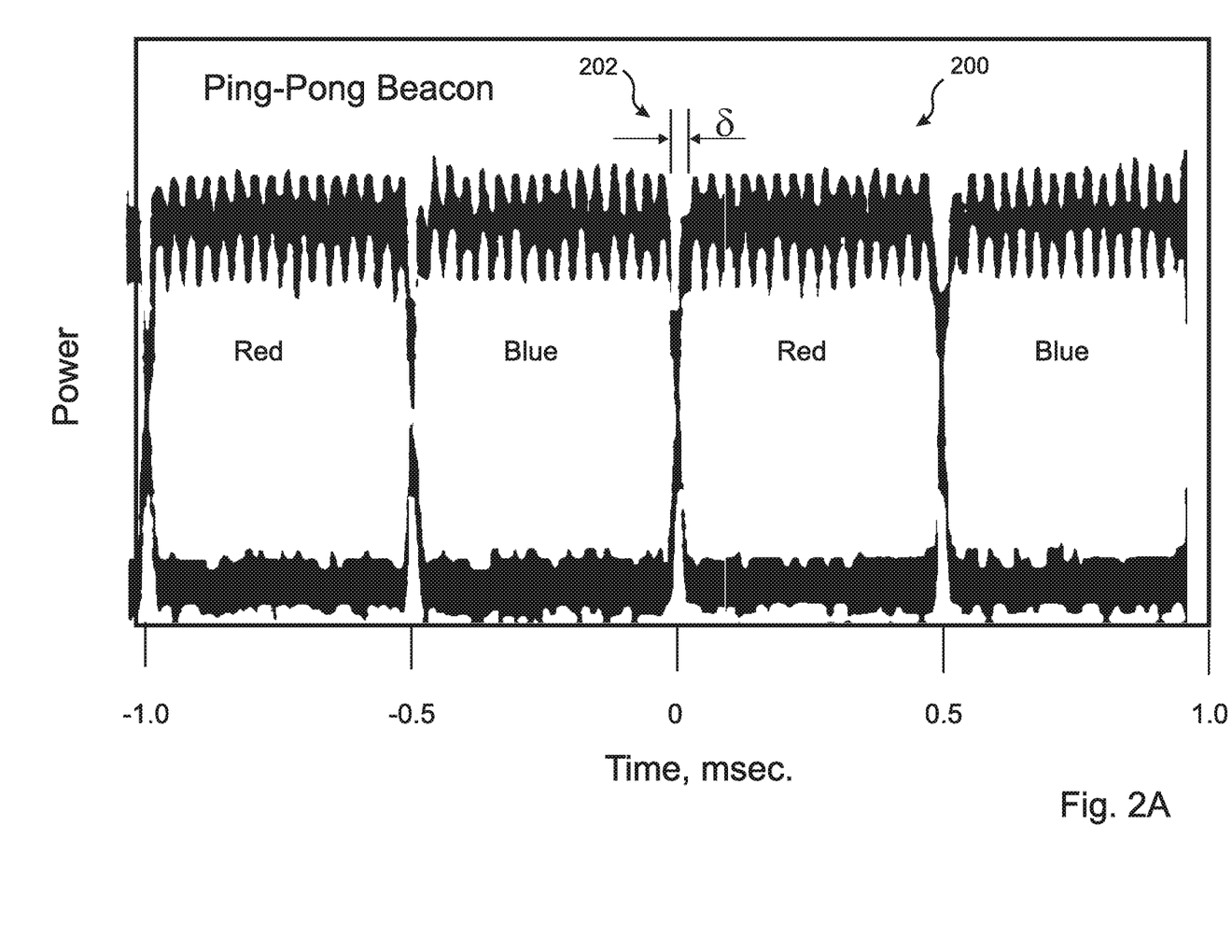
FIG. 2A is a graph illustrating near-contiguous interleaving of red and blue laser light in a ping-pong beacon.
Figure 2B:
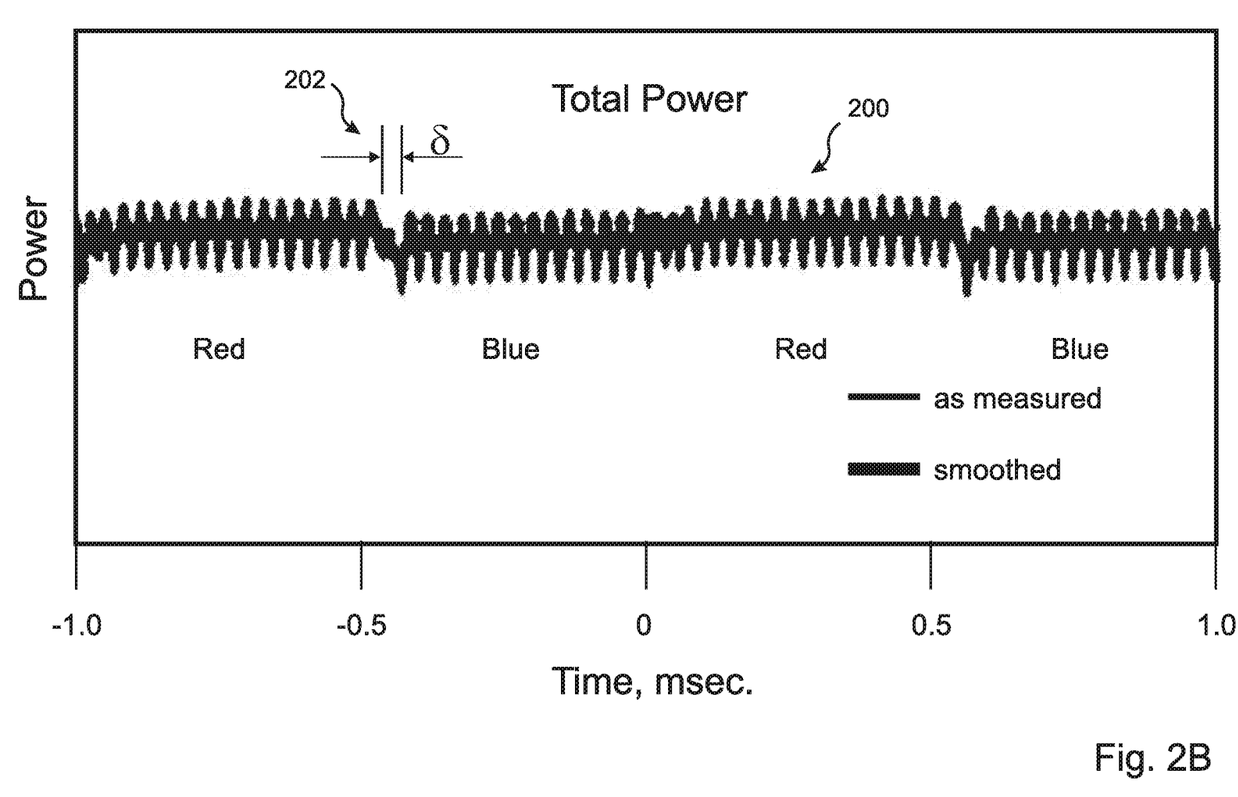
FIG. 2B is a graph indicating the substantially constant laser power of the ping-pong beacon of FIG. 2A.

During the acquisition phase, the two transmit lasers 102, 104 of FIG. 1B are used to generate a ping-pong beacon by rapidly switching between the outputs of the two lasers 102, 104. In embodiments, the outputs of the red 102 and blue 104 lasers have equal output amplitudes and are directed to a laser selector such as a 2×1 switch 106 that alternately selects between the red and blue beams, thereby forming, with reference to FIGS. 2A and 2B, a ping-pong modulated output beacon 200 that is rapidly switched between the wavelengths of the red 102 and blue 104 lasers, for example at a rate of between 100 Hz and 10 kHz, as is illustrated in FIG. 2A, while being constant in amplitude, as shown in FIG. 2B.

In the embodiment of FIG. 1B, the laser selector 106 is a 2×1 single pole double throw (SPDT) fiber-optic switch. In the illustrated embodiment, during the acquisition phase, the two transmit lasers 102, 104 direct continuous beams of substantially equal amplitude into the optical switch 106, and the switch is actuated by the controller 148 at the desired modulation frequency, so that the resulting ping-pong modulated beacon 200 is continuous in amplitude but rapidly alternating in wavelength when it emerges from the SPDT switch 106. In embodiments, the SPDT switch 106 has a switching "dead time" d 202 of less than 0.5 us, or even less than 0.3 usec.

In similar embodiments, the outputs of the transmit lasers 102, 104 are simply combined, and the lasers 102, 104 are alternately driven to produce the ping-pong modulated output beacon 200.

In other embodiments, the transmit module 126 comprises a single, tunable laser that is alternately tuned between the red and blue wavelengths to provide the ping-pong modulated output beacon 200. For example, embodiments implement tunable lasers similar to the lasers that are used for Dense Wave Division Multiplexing, as specified by the International Telecommunication union ("ITU-DWDM"). In an exemplary embodiment, for example, the blue laser wavelength is Channel #33 at 1550.92 nm, and the Red laser wavelength is Channel #30 at 1553.33 nm, thereby providing a separation of 2.4 nm between the red and blue wavelengths.

In various embodiments, the HPOA 108 is an erbium-doped fiber amplifier (EDFA) or an yttrium-doped fiber amplifier (YDFA). In embodiments, the "red" and "blue" wavelengths are selected to be close enough to each other to limit gain variation in the EDFA, YDFA, or other HPOA 108 to less than 1 dB, while remaining sufficiently separated to allow the two laser wavelengths to be isolated from each other by a factor of 60 to 100 dB or more. For example, in embodiments the red and blue wavelengths are in the 1550 nm spectral region, and are separated by between 2.4 nm (300 GHz) and 15 nm (1875 GHz).

In the embodiment of FIG. 1B, the ping-pong beam 200 is modulated by the modulator 110 at a high frequency before reaching the HPOA(s) 108 to avoid stimulated Brouillon scattering (SBS). In embodiments, the modulator 110 is a Mach Zender modulator (MZM) and is used to modulate both wavelengths of the ping-pong beam with a 50% duty cycle at the communications rate, or at some other rate that is at least 5 times faster than the ping-pong wavelength switching rate. In the illustrated embodiment, during the communication phase, the modulator 110 functions as a communication modulator, in that it encodes communication information onto either the "red" laser light or the "blue" laser light before it is transmitted, according to which laser output is selected by the SPDT optical switch 106, i.e. according to whether the terminal is configured as a "red" terminal or as a "blue" terminal.

According to the disclosed terminal architecture, at any given time the receive module 114 of the terminal is configured to receive input at only one laser wavelength while excluding all other wavelengths. As a result, ping-pong modulated beacons are perceived by the receiving terminal as being square wave modulated. Accordingly, while a ping-pong beacon is composed of alternating, nearly contiguous "red" and "blue" pulses, nevertheless a ping-pong modulated beacon is easily distinguished from other light sources due to its perceived square-wave intensity modulation after wavelength filtering by the receive module 114.

In the embodiment of FIG. 1B, once alignment has been completed between two terminals and the communication phase has begun, the communication signals themselves are used for spatial tracking to maintain optical alignment between the terminals. In particular, a receive beam splitter 152 is implemented that apportions received laser light 124 between a communication detection channel 118 and an "acquisition and track sensor" (ATS) 128 that is used to establish and maintain optical alignment.

Embodiments of the present disclosure are configured to emit circular polarized beacon and communication beams in the free-space path between the terminals, and to direct and differentiate received laser light according to its polarization state. The embodiment of FIG. 1B includes a diplexer 150 that imposes circular polarization onto all of the laser light 112 that is transmitted by the laser communication terminal, including both the beacon that is transmitted during the acquisition phase and communication beams that are transmitted during the communication phase. In the illustrated embodiment, the transmit laser module 126 is configured to emit a linearly polarized beam. The diplexer 150 includes a polarization beam splitter 122 followed by a polarization retarder (i.e. quarter-wave plate) 132 that converts the linear polarized light from the beam splitter 122 into a circular polarized output beam 112. In embodiments, the quarter-wave plate 132 can be mechanically or electrically transitioned between imposing right and left circular polarization onto the output beam 112. The quarter-wave plate 132 also converts circularly polarized received light into linear polarized light 124 that is directed by the polarization beam splitter 122 to the receive module 114.

Figure 1C:
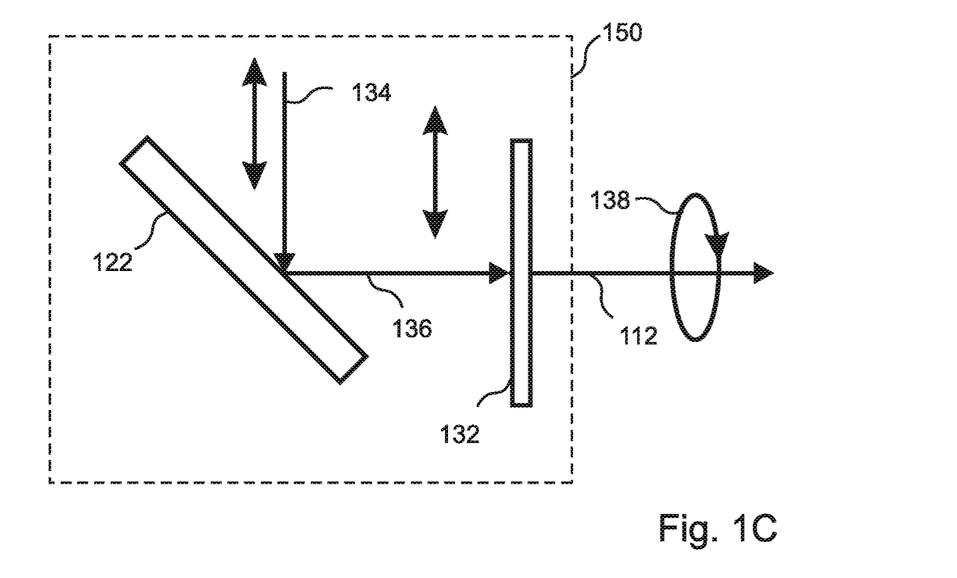
FIG. 1C is a block diagram that illustrates the interaction between transmitted laser light and the polarization beam splitter and waveplate in an embodiment of the present disclosure.

For example, with reference to FIG. 1C, if the transmit laser module 126 is configured to emit vertically polarized red light 134, then the polarization beam splitter 122 will be horizontally polarized and the vertically polarized red light 134 from the transmit laser module 126 will be reflected 136 by the polarization beam splitter 122 to the quarter-wave plate 132, and converted thereby into an output beam 112 that is right circularly polarized 138 (according to the illustrated example).

Figure 1D:
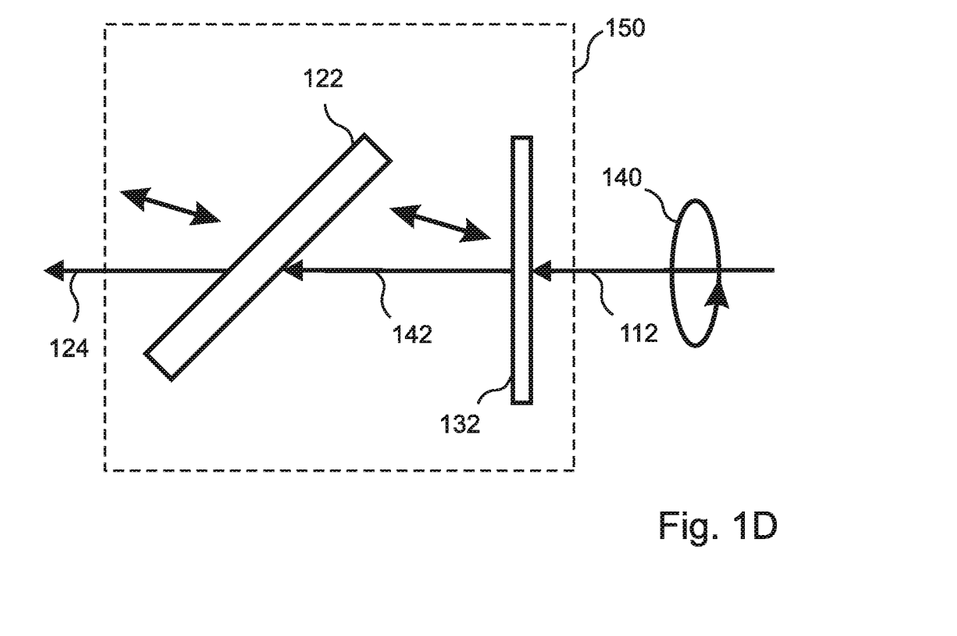
FIG. 1D is a block diagram that illustrates the interaction between received laser light and the polarization beam splitter and waveplate in an embodiment of the present disclosure.

With reference to FIG. 1D, communications 112 will be received according to this example as left circularly polarized 140 blue light 112, which will be converted into horizontally polarized blue light 142 by the quarter-wave plate 132, and then transmitted through the horizontally polarization beam splitter 122 as received light 124 into the switchable filter 116 of the receive module 114.

In some embodiments that include separate red 102 and blue 104 transmit lasers, the red 102 and blue 104 lasers are tunable over limited wavelength ranges. And in some of these embodiments, where wavelength alternation such as a ping-pong beacon 200 is implemented as the beacon modulation during the acquisition phase, the performance during the acquisition phase is even further enhanced by tuning at least one of the red 102 and blue 104 lasers away from its communication wavelength, so that the difference between the two laser wavelengths of the beacon 200 is increased, thereby increasing discrimination between the two wavelengths by the filters 116 of the receive channel 114 and improving the accuracy of the data provided by the highly sensitive "acquisition and track sensor" (ATS) 128. During the communication phase, the two lasers 102, 104 are re-tuned to their respective communication wavelengths, which are sufficiently separated from each other to satisfy the filtering requirements of the TOF 118 and communication detector.

For example, in embodiments if the red and blue wavelengths are separated by 3.2 nm, and if during the acquisition phase the filters 116 of the receive channel 114 of a first laser communication terminal are tuned to the red communication wavelength while receiving a ping-pong beacon from a second laser communication terminal, then the wavelength of the blue laser 104 of the second laser communication terminal can be off-tuned so that the separation between the two ping-pong wavelengths is increased to e.g. 5.2 nm, thereby enabling the filters 116 that are included in the receive channel 114 to provide greater suppression of the blue component of the beacon light 200.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. A laser communication terminal that is configured to establish optical alignment with a remote terminal during an acquisition phase, and to communicate message information with the remote terminal during a communication phase, the laser communication terminal comprising:
   a transmit channel comprising a transmit laser module that is configured to emit transmit laser light at a first communication wavelength and a second communication wavelength, the transmit laser module being configured to generate a beacon modulation by switching between the first communication wavelength and the second communication wavelength as an alignment beacon during the acquisition phase and be identified as the alignment beacon by the remote terminal;
   a modulator configured to modulate the transmit laser light;
   a receive channel comprising:
      a receive filter module configured to pass the transmit laser light while substantially excluding light at other wavelengths;
      an acquisition and track sensor ("ATS") configured to derive tracking information from a beacon laser light received from the remote terminal via the receive filter module at or near the second communication wavelength during the acquisition phase, and to provide the tracking information to a controller, according to which the controller is able to cause the laser communication terminal to be optically aligned with the remote terminal; and
      a communication detector configured to derive communication information from communication laser light received from the remote terminal via the receive filter module at the second communication wavelength during the communication phase; and
   a receive beam splitter configured to apportion the beacon laser light and the communication laser light between the ATS and the communication detector.

2. The laser communication terminal of claim 1, wherein the transmit channel is configured to impose a high frequency modulation onto the alignment beacon, and wherein the beacon modulation includes at least one of a frequency variation and a phase variation of the high frequency modulation.

3. The laser communication terminal of claim 1, wherein an amplitude of the alignment beacon is constant.

4. The laser communication terminal of claim 1, wherein the alternation of the alignment beacon between the first communication wavelength and the second communication wavelength includes alternating intervals of substantially equal length during which the alignment beacon is respectively at the first and second communication wavelengths.

5. The laser communication terminal of claim 1, wherein the transmit laser module includes a laser that is tunable between the first communication wavelength and the second communication wavelength.

6. The laser communication terminal of claim 1, wherein the transmit laser module includes a first laser configured to emit laser light at the first communication wavelength and a second laser configured to emit laser light at the second communication wavelength.

7. The laser communication terminal of claim 6, wherein the laser light emitted by the first and second lasers is directed to respective first and second inputs of a laser selector, the laser selector being configured to select between its inputs and to direct the laser light from the selected input to the modulator.

8. The laser communication terminal of claim 7, wherein the laser selector is a 2×1 laser switch.

9. The laser communication terminal of claim 7, wherein the laser selector has a switching dead time that is shorter than 0.5 usec.

10. The laser communication terminal of claim 1, wherein the laser communication terminal is switchable between:
   a first terminal configuration in which during the communication phase the transmit channel emits laser light at the first communication wavelength and the receive filter module passes light at the second communication wavelength with minimal attenuation while excluding all other wavelengths; and
   a second terminal configuration in which during the communication phase the transmit channel emits laser light at the second communication wavelength and the receive filter module passes light at the first communication wavelength with minimal attenuation while excluding all other wavelengths.

11. The laser communication terminal of claim 1, wherein the transmit channel is configured to emit linear polarized laser light, and wherein the laser communication terminal further comprises a diplexer that includes a diplexer polarization beam splitter and a quarter-wave plate, the diplexer being configured to transform the linear polarized light emitted by the transmit laser module into circular polarized laser light that is transmitted by the laser communication terminal, and to convert received circular polarized light into received linear polarized light that is directed to the receive channel.

12. A method of establishing optical alignment between two laser communication terminals, the method comprising:
providing first and second laser communication terminals, each according to claim 1
during the acquisition phase, causing the second laser communication terminal to transmit the alignment beacon at or near the second communication wavelength, the alignment beacon having the beacon modulation imposed thereupon, wherein the beacon modulation is generated by switching between the first communication wavelength and the second communication wavelength;
during the acquisition phase, causing the receive channel of the first laser communication terminal to receive light from the alignment beacon and to detect the beacon modulation;
during the acquisition phase, causing the first laser communication terminal to direct the light from the alignment beacon to its acquisition tracking sensor (ATS), and to derive tracking information therefrom; and
during the acquisition phase, causing the first laser communication terminal to optically align itself with the second laser communication terminal according to the tracking information,
wherein the laser communication terminal is switchable between:
the first terminal configuration in which during the communication phase the transmit channel emits laser light at the first communication wavelength and the receive filter module passes light at the second communication wavelength with minimal attenuation; and
the second terminal configuration in which during the communication phase the transmit channel emits laser light at the second communication wavelength and the receive filter module passes light at the first communication wavelength with minimal attenuation.

13. The method of claim 12, wherein causing the second laser communication terminal to transmit a beacon modulated alignment beacon includes causing the second laser communication terminal to alternate the alignment beacon between a first beacon wavelength and a second beacon wavelength.

14. The method of claim 13, wherein the alternation of the alignment beacon between the first beacon wavelength and the second beacon wavelength includes alternating intervals of substantially equal length during which the alignment beacon is respectively at the first and second beacon wavelengths.

15. The method of claim 13, wherein the first and second beacon wavelengths are respectively the first and second communication wavelengths.

16. The method of claim 12, wherein the method further comprises imposing by the second laser communication terminal of a high frequency modulation onto the alignment beacon, and wherein the beacon modulation includes at least one of a frequency variation and a phase variation of the high frequency modulation.

17. The laser communication terminal of claim 1, wherein the receive filter is a tunable optical filter passing either the first communications wavelength or the second communications wavelength.

18. A laser communication terminal, comprising:
a transmit channel comprising a transmit laser module that is configured to emit transmit laser light at a first communication wavelength and a second communication wavelength, the transmit laser module being configured to generate a beacon modulation by switching between the first communication wavelength and the second communication wavelength;
a modulator configured to modulate the transmit laser light;
a receive channel comprising:
a receive filter module configured to pass the transmit laser light while substantially excluding light at other wavelengths;
an acquisition and track sensor ("ATS") configured to derive tracking information from a beacon laser light received from a remote terminal via the receive filter module at or near the second communication wavelength during an acquisition phase, and to provide the tracking information to a controller, the controller is configured to cause the laser communication terminal to be optically aligned with the remote terminal; and
a communication detector configured to derive communication information from communication laser light received from the remote terminal via the receive filter module at the second communication wavelength during a communication phase; and
a receive beam splitter configured to apportion the beacon laser light and the communication laser light between the ATS and the communication detector,
wherein the laser communication terminal is switchable between:
a first terminal configuration in which during the communication phase the transmit channel emits modulated laser light at the first communication wavelength and the receive filter module passes light at the second communication wavelength with minimal attenuation while substantially excluding other wavelengths; and
a second terminal configuration in which during the communication phase the transmit channel emits modulated laser light at the second communication wavelength and the receive filter module passes light at the first communication wavelength with minimal attenuation while substantially excluding other wavelengths.

* * * * *